(12) United States Patent (10) Patent No.: US 9,221,670 B2
Wolfson (45) Date of Patent: Dec. 29, 2015

(54) GLUELESS POCKETED SPRING UNIT CONSTRUCTION

(71) Applicant: Martin Wolfson, Dallas, TX (US)

(72) Inventor: Martin Wolfson, Dallas, TX (US)

(*) Notice: Subject to any disclaimer, the term of this patent is extended or adjusted under 35 U.S.C. 154(b) by 196 days.

(21) Appl. No.: 14/158,811

(22) Filed: Jan. 18, 2014

(65) Prior Publication Data

US 2014/0201924 A1 Jul. 24, 2014

Related U.S. Application Data

(60) Provisional application No. 61/757,075, filed on Jan. 25, 2013, provisional application No. 61/754,529, filed on Jan. 19, 2013.

(51) Int. Cl.
| | | |
|---|---|---|
| *B68G 9/00* | (2006.01) |
| *A47C 27/07* | (2006.01) |
| *A47C 27/06* | (2006.01) |
| *B29C 65/08* | (2006.01) |
| *B29C 65/78* | (2006.01) |
| *B29C 65/72* | (2006.01) |
| *B29L 31/58* | (2006.01) |
| *B29L 31/00* | (2006.01) |
| *B68G 7/12* | (2006.01) |

(Continued)

(52) U.S. Cl.
CPC ................ *B68G 9/00* (2013.01); *A47C 27/062* (2013.01); *A47C 27/064* (2013.01); *A47C 27/07* (2013.01); *B29C 65/08* (2013.01); *B29C 65/088* (2013.01); *B29C 65/72* (2013.01); *B29C 65/7838* (2013.01); *B29L 2031/58* (2013.01); *B29L 2031/751* (2013.01); *B68G 7/12* (2013.01); *B68G 11/06* (2013.01); *B68G 15/00* (2013.01); *Y10T 29/48* (2015.01); *Y10T 29/481* (2015.01); *Y10T 29/49609* (2015.01); *Y10T 156/1751* (2015.01)

(58) Field of Classification Search
CPC .... A47C 27/07; A47C 27/064; A47C 27/062; B68G 9/00; B68G 11/06; B68G 7/06; B29C 65/088; B29L 2031/58; B29L 2031/751; Y10T 29/48; Y10T 29/49609; Y10T 29/49826
See application file for complete search history.

(56) References Cited

U.S. PATENT DOCUMENTS

| 6,315,275 B1 | 11/2001 | Zysman | |
|---|---|---|---|
| 6,347,423 B1* | 2/2002 | Stumpf | A47C 27/064 5/655.9 |
| 7,211,167 B1* | 5/2007 | Whitworth | B68G 9/00 118/220 |

(Continued)

FOREIGN PATENT DOCUMENTS

WO 2004014783 A1 2/2004

OTHER PUBLICATIONS

Korean Intellectual Property Office, International Search Report, May 7, 2014.

(Continued)

*Primary Examiner* — Moshe Wilensky
(74) *Attorney, Agent, or Firm* — Seth A. Horwitz; Robert O. Groover, III

(57) ABSTRACT

Methods and systems for no-glue pocketed spring unit construction. Rows of pocketed springs, preferably arranged into modules of more than two pocketed springs surrounding a central hole, are ultrasonically welded together when paired vibrating probes and anvils press layers of pocketed spring fabric from the rows of pocketed springs together and a welding pulse is transmitted to the vibrating probe.

15 Claims, 14 Drawing Sheets

(51) Int. Cl.
*B68G 11/06* (2006.01)
*B68G 15/00* (2006.01)

(56) References Cited

U.S. PATENT DOCUMENTS

| 2008/0282476 | A1 | 11/2008 | Lundevall |
| 2009/0266032 | A1 | 10/2009 | Spinks et al. |
| 2010/0011509 | A1 | 1/2010 | Stjerna et al. |
| 2012/0286460 | A1* | 11/2012 | Tyree ............... A47C 23/043 267/91 |
| 2013/0081207 | A1* | 4/2013 | Cohen ............... A47C 27/056 5/718 |

OTHER PUBLICATIONS

Korean Intellectual Property Office, Written Opinion of the International Searching Authority, May 7, 2014.

* cited by examiner

GLUELESS POCKETED SPRING UNIT CONSTRUCTION

CROSS-REFERENCE

Priority is claimed from U.S. Provisional App. No. 61/754,529 filed Jan. 19, 2013, which is hereby incorporated by reference.

Priority is claimed from U.S. Provisional App. No. 61/757,075 filed Jan. 25, 2013, which is hereby incorporated by reference.

BACKGROUND

The present application relates to methods and systems for no-glue construction of pocketed inner spring units, and more particularly to methods and systems for using ultrasonic heating to construct pocketed inner spring units.

Note that the points discussed below may reflect the hindsight gained from the disclosed inventions, and are not necessarily admitted to be prior art.

Connecting rows of pocketed springs together using a scrim sheet generally causes a trampoline-like effect, i.e., compressing springs in one part of the unit pulls on another part of the unit.

Glue connections between pocketed springs generally provide a "crunchier" feeling to a completed pocketed spring unit than connections made by ultrasonic welding.

SUMMARY

The inventor has discovered surprising new approaches to methods and systems for manufacturing glueless pocketed spring cushioning units for use in mattresses and other cushioning assemblies. Rows of pocketed springs preferably comprise multi-pocketed spring modules, springs having uniform coil diameter, ones of said modules comprising more than two pocketed springs welded together to leave a central opening. Rows of pocketed springs are retained in position by pins, and are transferred to corresponding rows of vibrating probes and anvils which pinch layers of fabric together and form welds using ultrasonic vibrational energy.

BRIEF DESCRIPTION OF THE DRAWINGS

The disclosed inventions will be described with reference to the accompanying drawings, which show important sample embodiments and which are incorporated in the specification hereof by reference, wherein.

DETAILED DESCRIPTION OF SAMPLE EMBODIMENTS

Figure 1:
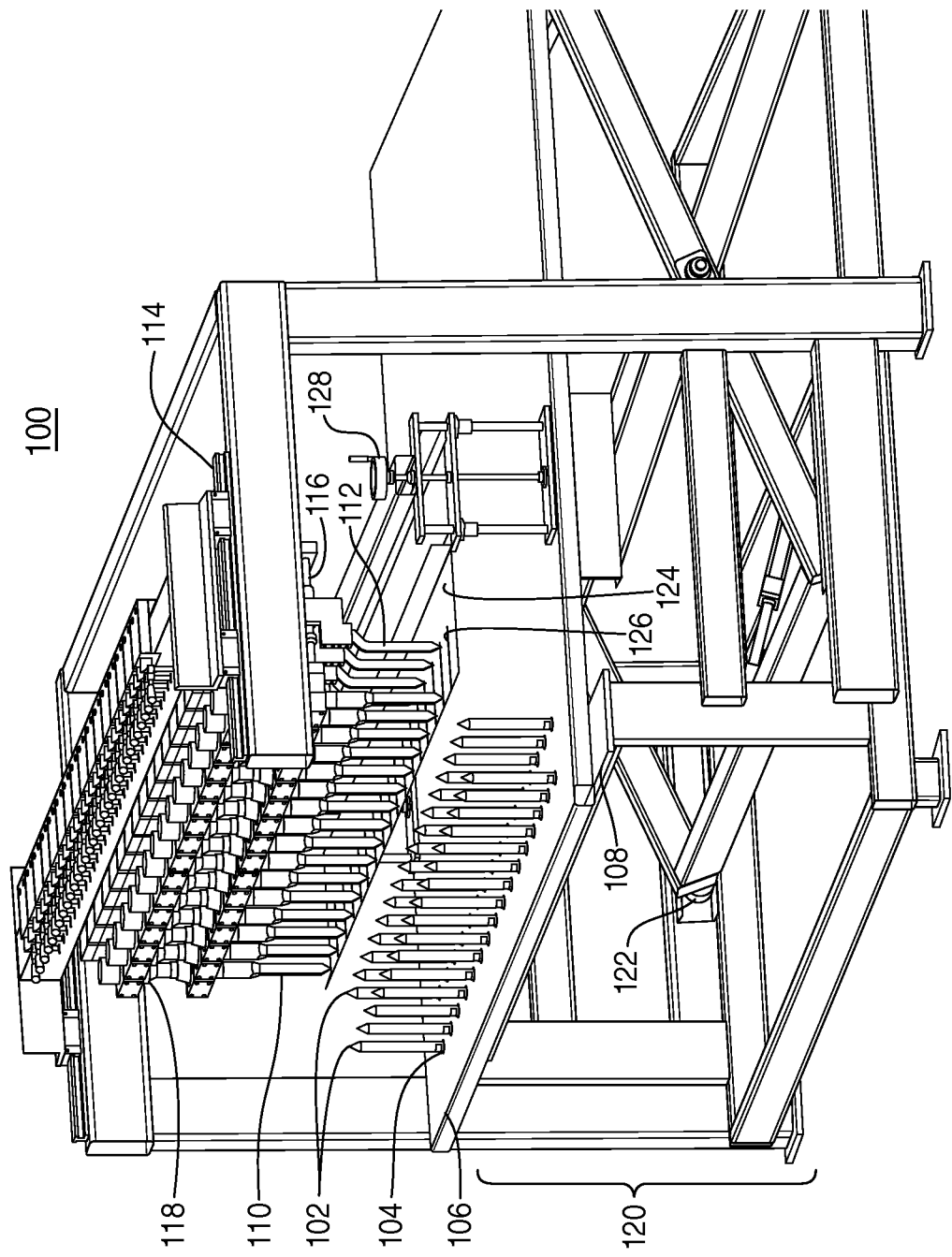
FIG. 1 schematically shows a machine for ultrasonically welding rows of pocketed spring modules to each other.

The present application discloses new approaches to constructing pocketed spring units. In particular, the inventor has developed various systems and methods for NO-GLUE construction of pocketed spring units.

The disclosed innovations, in various embodiments, provide one or more of at least the following advantages. However, not all of these advantages result from every one of the innovations disclosed, and this list of advantages does not limit the various claimed inventions.

pocketed spring unit construction uses NO GLUE;
 pocketed spring units, and cushioning assemblies incorporating pocketed spring units, are more comfortable and luxurious-feeling;
 cost-effective ultrasonic welding of rows of pocketed springs;
 none of the connections in pocketed spring units are glue connections;
 pocketed spring unit construction is less expensive;
 stronger connections between rows of pocketed springs;
 reduced environmental impact of pocketed spring unit construction;
 reduced environmental impact of cushioning assembly construction and maintenance;
 reduced weight of pocketed spring unit;
 reduced weight of cushioning assembly;
 lower cushioning assembly transportation cost per unit;
 reduced likelihood of unmoored pockets;
 reduced likelihood of loose springs.

The numerous innovative teachings of the present application will be described with particular reference to presently preferred embodiments (by way of example, and not of limitation). The present application describes several inventions, and none of the statements below should be taken as limiting the claims generally.

"Cushioning assembly" and "cushioning unit" are defined herein as any cushioning structure incorporating pocketed springs, e.g., a mattress, couch or cushion.

In preferred embodiments, pockets are formed gluelessly by ultrasonically welding together layers of a flexible material, generally plastic, such as spun bonded polypropylene weighing 1.5 ounces per square yard. By forming pockets of a chosen size on a chosen length and width of fabric, rows of pockets of a chosen length and sized for a chosen diameter and length of spring can be produced.

In preferred embodiments, uniform diameter springs are used. Uniform diameter springs can be manufactured by custom winding high tensile strength wire with highly uniform shape and thickness.

Some embodiments use or include microcoil springs, which are small springs suitable for use in pocketed spring units incorporated into, for example, upholstery.

Springs are inserted into pockets to form pocketed springs. Springs can be inserted into pockets oriented horizontally through a seam on top of the pocket, and then beaten until they reorient vertically. Generally, this results in a pocketed spring that, in a completed cushioning assembly, can only be oriented in a single direction. For example, a bed made in this way is typically called "one sided".

Springs can also be inserted oriented vertically through a seam on the side and allowed to expand to fill the pocket.

Pockets can be fashioned to be shorter than an uncompressed spring, so that pocketed springs are constantly under load ("preloaded"). This generally increases the useful lifetime of the spring, by allowing its spring constant to remain higher, for longer. Preloaded springs are generally inserted vertically compressed, and allowed to expand vertically to fill the pocket.

A row of pocketed springs, in which pocketed springs are connected to adjacent pocketed springs (e.g., by the same fabric that forms the pockets) can be formed as shown and described in, for example, U.S. Pat. No. 6,260,331.

Rows of pocketed springs can be fashioned into rows of multi-pocket "modules", comprising more than two—generally, four—pockets welded together to leave an opening (a hole) in the middle. Rows of modules can then be ultrasonically welded together, and those rows can then be welded to each other to form pocketed spring units. Pocketed spring modules can be assembled as shown and described in, for example, U.S. Pat. No. 6,347,423. Preferably, nearest-adjacent (not catty-corner) springs in modules have uniform spacing from each other.

Multiple horizontally-adjacent rows of pocketed springs can be connected together to form pocketed spring cushioning units. Generally, pocketed spring units look like arrays of pocketed springs from above.

Springs in completed pocketed spring units are compressed very flat and rolled up into tight cylinders for shipping.

Glue can be used in layers of a cushioning assembly manufactured as disclosed herein other than the inventive pocketed spring cushioning unit layer(s).

FIG. 1 schematically shows a machine 100 for ultrasonically welding rows of pocketed spring modules 200 to each other. In FIG. 1, the machine is in an initial position, without pocketed spring modules 200. Two rows of upward-facing vertical positioning pegs 102 are disposed to penetrate holes 104 in a liftable table 106, are attached to a stable surface 108 beneath the liftable table 106, and are configured to hold two rows of pocketed spring modules 200 in position (see, e.g., FIG. 2). Rows of pegs 102 are aligned so that a line through a row of pegs 102 is perpendicular to a line between two nearest pegs 102 in two different rows. (The left-most row of pegs 102 and row of pocketed spring modules 200 in the figures will be called herein the "front" rows, and the right-most rows will be called the "far" rows.)

As shown in FIG. 1, the front row of downward facing phalanges are the vibrating probes 110 (also called horns), and the far-most row of downward facing phalanges are anvils 112. Advantageously, the probes 110 and the anvils 112 are spaced at approximately the same intervals as the upward-facing pegs 102, and are positioned so that when they are moved (e.g., on a rail system 114, as shown) front-wards to their front-most position, they vertically align with the pegs 102.

The bottom-most (approximately) inch of the vibrating probes 110 (the "active region") is configured to vibrate at a frequency suitable for compressing and heating the plastic fabric of the pockets to a pressure and temperature suitable for welding together multiple layers (generally two or more layers) of said plastic fabric. (A weld can be performed on, e.g., four layers, such as if the modules 200 are formed from pairs of rows of pocketed springs welded together, and the rows of pocketed springs are pocketed in pockets formed from a long single sheet of fabric doubled over width-wise).

Preferably, the active region of a vibrating probe 110 is located on its side, i.e., a horizontally-facing edge (at, part of or including where the vibrating probe 110 presses against the anvil 112). This simplifies the mechanical operation of the vibrating probes 110 and anvils 112 inserting into the central openings in individual modules 200 and pressing together, with spring pocket fabric between, so that the contact region and the active region overlap, allowing welding in the contact region.

Welding occurs when the vibrating probes 110 and the anvils 112 move together, and the active regions of the vibrating probes 110 and a facing surface of corresponding anvils 112 press flush against each other with the layers of fabric to be welded between them. The vibrating probe 110 is then activated with a welding pulse at a (1) frequency, (2) energy level and (3) amount of pressure against the anvil 112 tuned to weld the particular density and thickness of plastic fabric of the pockets. The vibrating probes 110 and anvils 112 can be pushed together by, e.g., a rail system 116 (as shown in FIG. 1, a rail system 116 using air actuators separate from the rail system 114 that moves the vibrating probes 110 and anvils 112 front-ward and far-ward together). Vibrations can be provided by transducers 118 integrated into the mechanism, as shown in FIG. 1 above the vibrating probes 110. Generally, vibrations of vertically-oriented probes 110 will be primarily horizontal.

Spacing of pegs 102, vibrating probes 110 and anvils 112 can be adjustable to correspond to module 200 diameter and hole 104 placement.

The table 106 through which the pegs 102 are disposed includes a lift mechanism 120 to push the liftable table 106 upwards; the upward-moving table 106 pushes upwards any rows of pocketed spring modules 200 disposed on the pegs 102. The lift mechanism 120 shown in FIG. 1 comprises servo motors 122. The table 106 also includes an extractor plate 124, described in more detail with respect to FIGS. 8 and 10.

Figure 2:
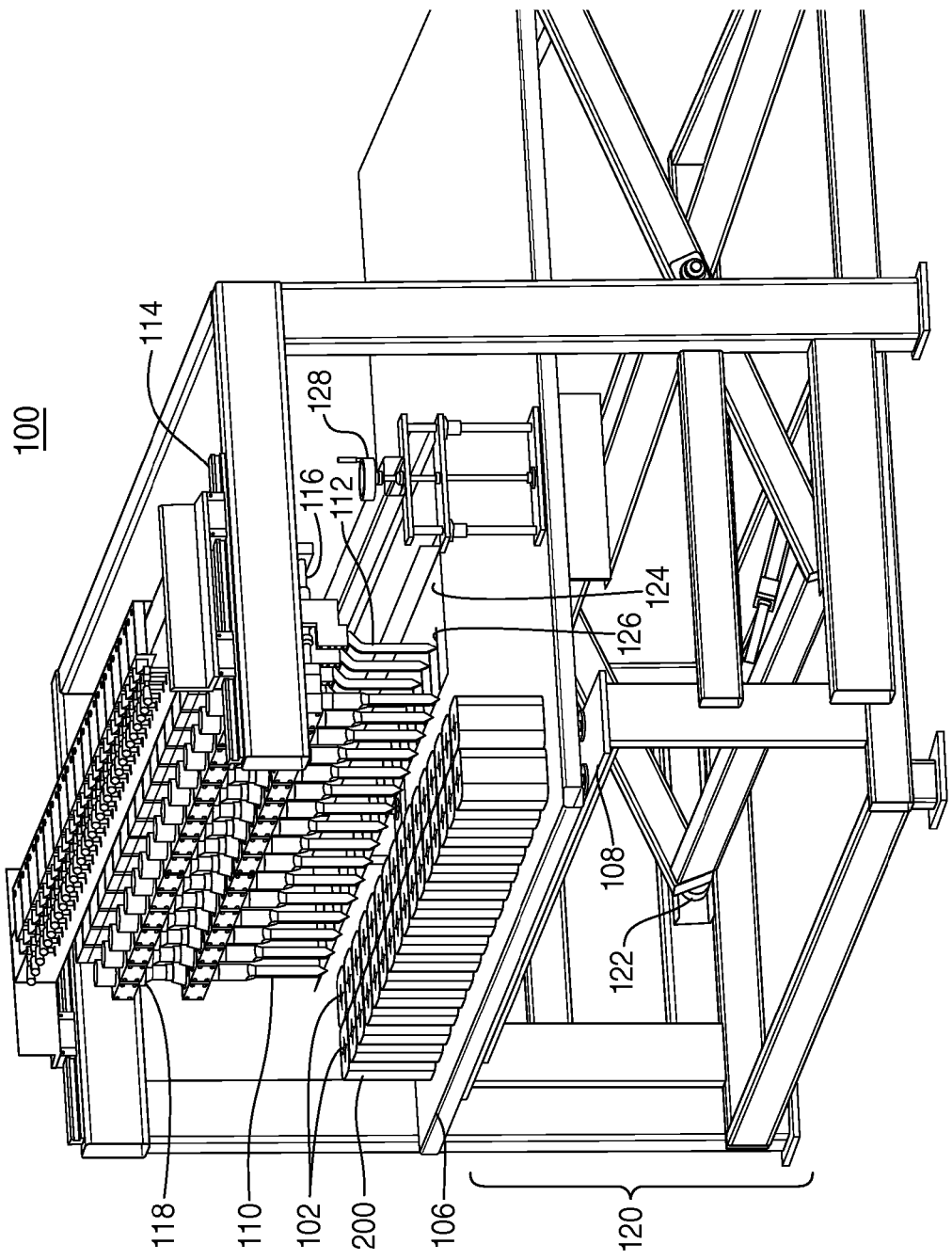
FIG. 2 schematically shows a machine for ultrasonically welding rows of pocketed spring modules to each other.

FIG. 2 schematically shows a machine 100 for ultrasonically welding rows of pocketed spring modules 200 to each other. In embodiments as shown in FIG. 2, rows of pocketed spring modules 200 are disposed on, and spatially aligned by, the pegs 102. Here, pocketed spring modules 200 comprise four pocketed springs. Preferably, two rows of pocketed springs are welded together to form modules 200 prior to the modules being loaded onto the machine 100, allowing entire rows of modules to be treated as individual, separate units.

Module holes 202 are aligned with pegs 102, and rows of modules 200 are dropped or pushed onto corresponding rows of pegs 102. Advantageously, springs within the pockets are of uniform size, and modules 200 are spaced a uniform distance from each other. Uniform sizing can be advantageously enhanced by using springs made from high tensile wire of even thickness and consistent shape, and by using substantially the same length of wire to form each coil.

Figure 3:
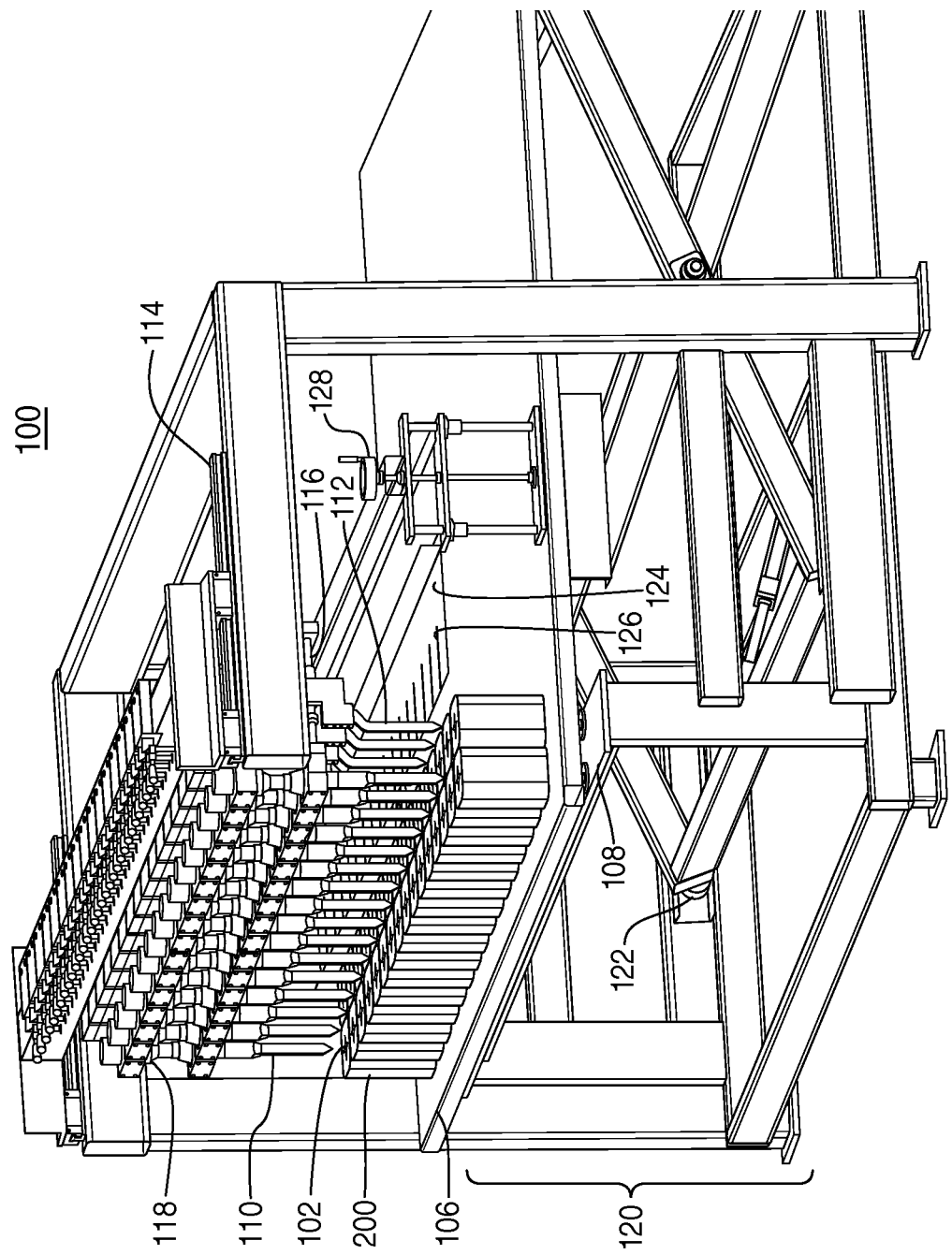
FIG. 3 schematically shows a machine for ultrasonically welding rows of pocketed spring modules to each other.

FIG. 3 schematically shows a machine 100 for ultrasonically welding rows of pocketed spring modules 200 to each other. As shown in FIG. 3, the vibrating probes 110 and anvils 112 move leftward together to be vertically aligned over the pegs 102, and thus also over the holes 202 described by the middles of the pocketed spring modules 200.

Figure 4:
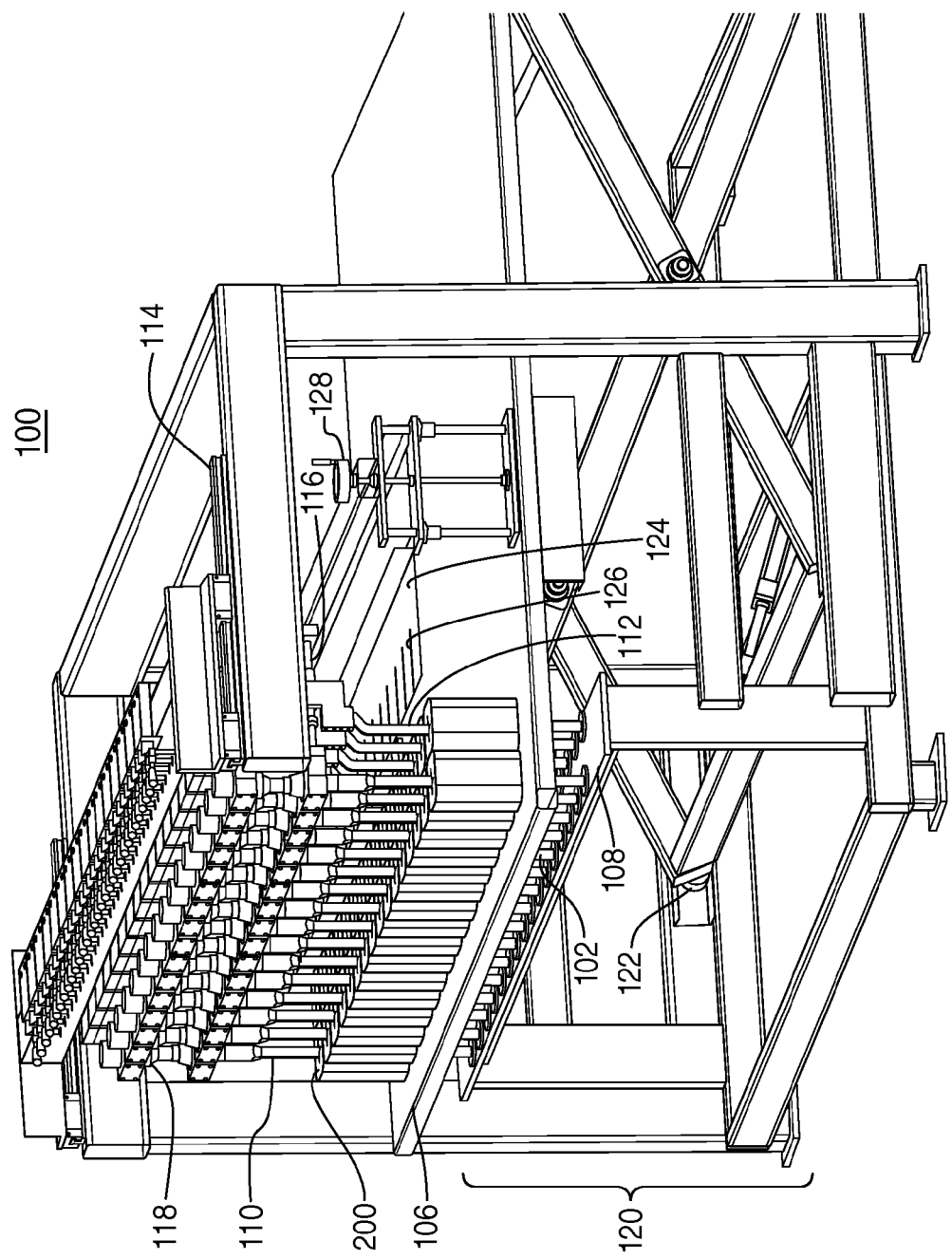
FIG. 4 schematically shows a machine for ultrasonically welding rows of pocketed spring modules to each other.

FIG. 4 schematically shows a machine 100 for ultrasonically welding rows of pocketed spring modules 200 to each other. As shown in FIG. 4, the table 106 pushes the rows of modules 200 upwards, partially off the pegs 102 and (correspondingly) partially onto the vibrating probes 110 and anvils 112 disposed above, and vertically aligned with, the pegs 102.

Figure 5:
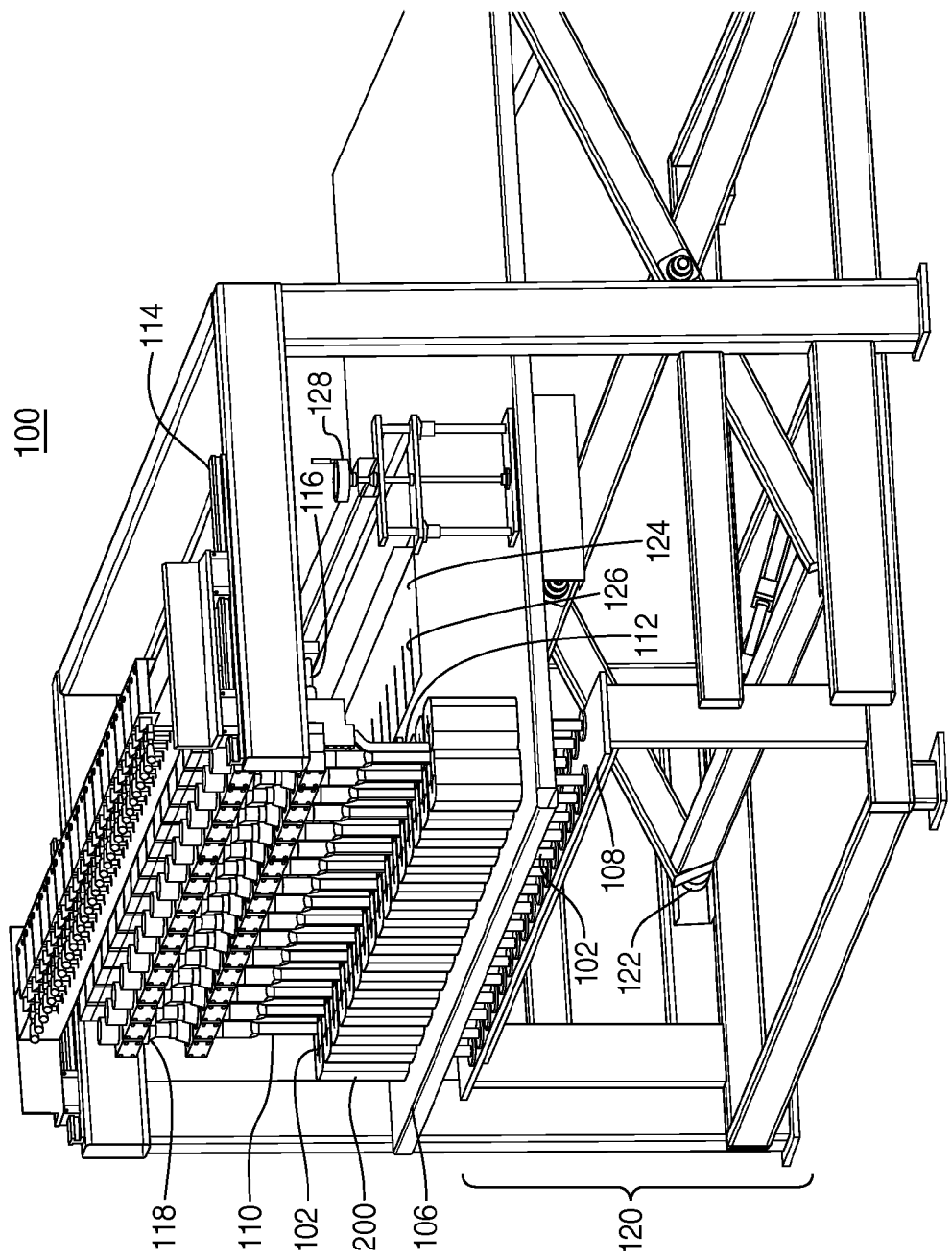
FIG. 5 schematically shows a machine for ultrasonically welding rows of pocketed spring modules to each other.

FIG. 5 schematically shows a machine 100 for ultrasonically welding rows of pocketed spring modules 200 to each other. As shown in FIG. 5, the vibrating probes 110 and anvils 112 push the fabric between them—and between two corresponding pairs of pocketed springs in different rows of pocketed spring modules 200—together. When a suitable pressure has been achieved, a welding pulse of vibration is sent through the vibrating probes 110, heating the fabric to the point of melting together the layers of fabric compressed by respective vibrating probes 110 and anvils 112. The vertical position of the active region of the vibrating probe 110 during welding corresponds to the vertical position of the weld.

Figure 6:
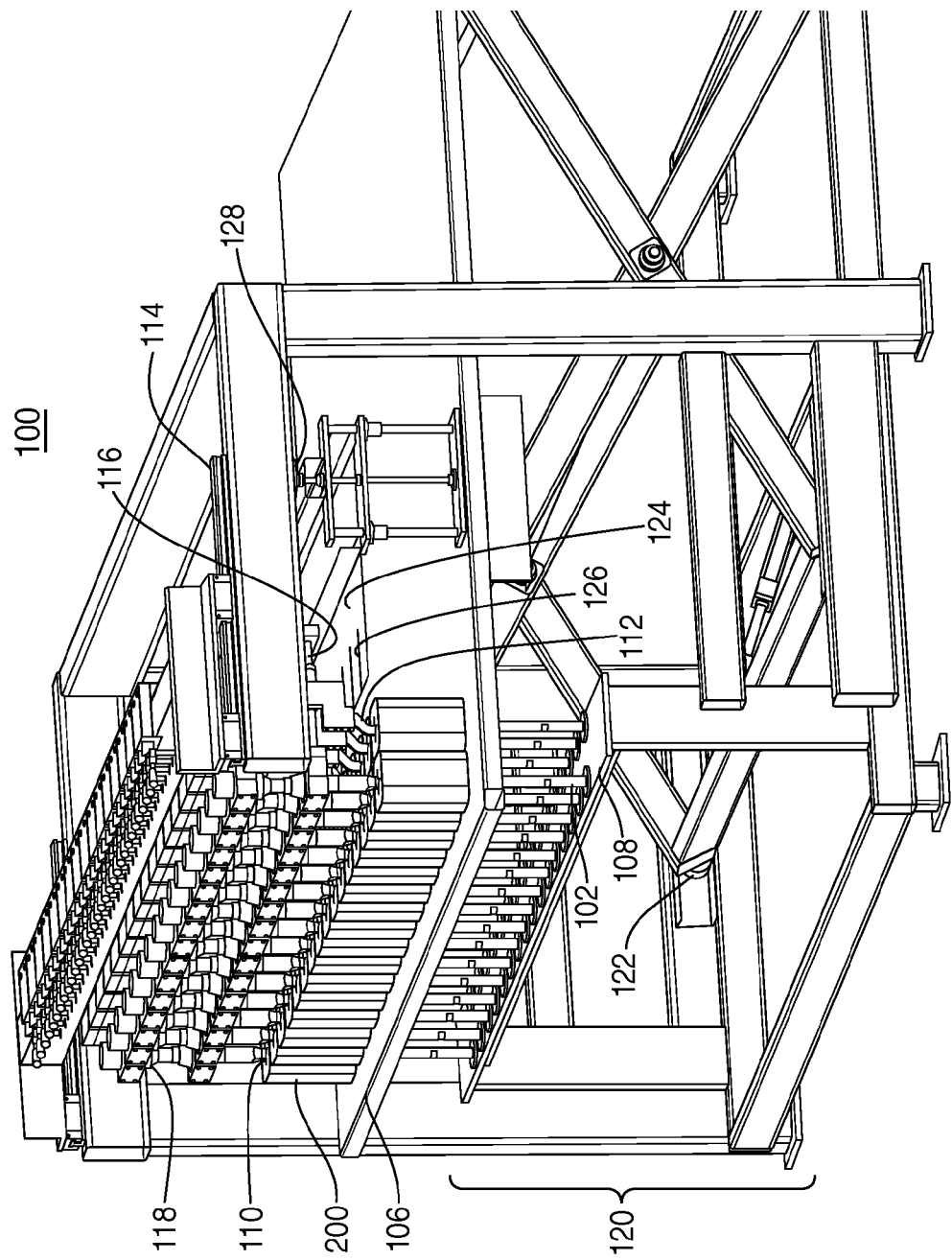
FIG. 6 schematically shows a machine for ultrasonically welding rows of pocketed spring modules to each other.

FIG. 6 schematically shows a machine for ultrasonically welding rows of pocketed spring modules 200 to each other. As shown in FIG. 6, the vibrating probes 110 and anvils 112 have separated to their horizontal positions as shown in FIG. 4, and the liftable table 106 has risen higher (than in FIG. 5), pushing the rows of pocketed spring modules 200 almost entirely onto the corresponding vibrating probes 110 and anvils 112 and off of the pegs 102.

Figure 7:
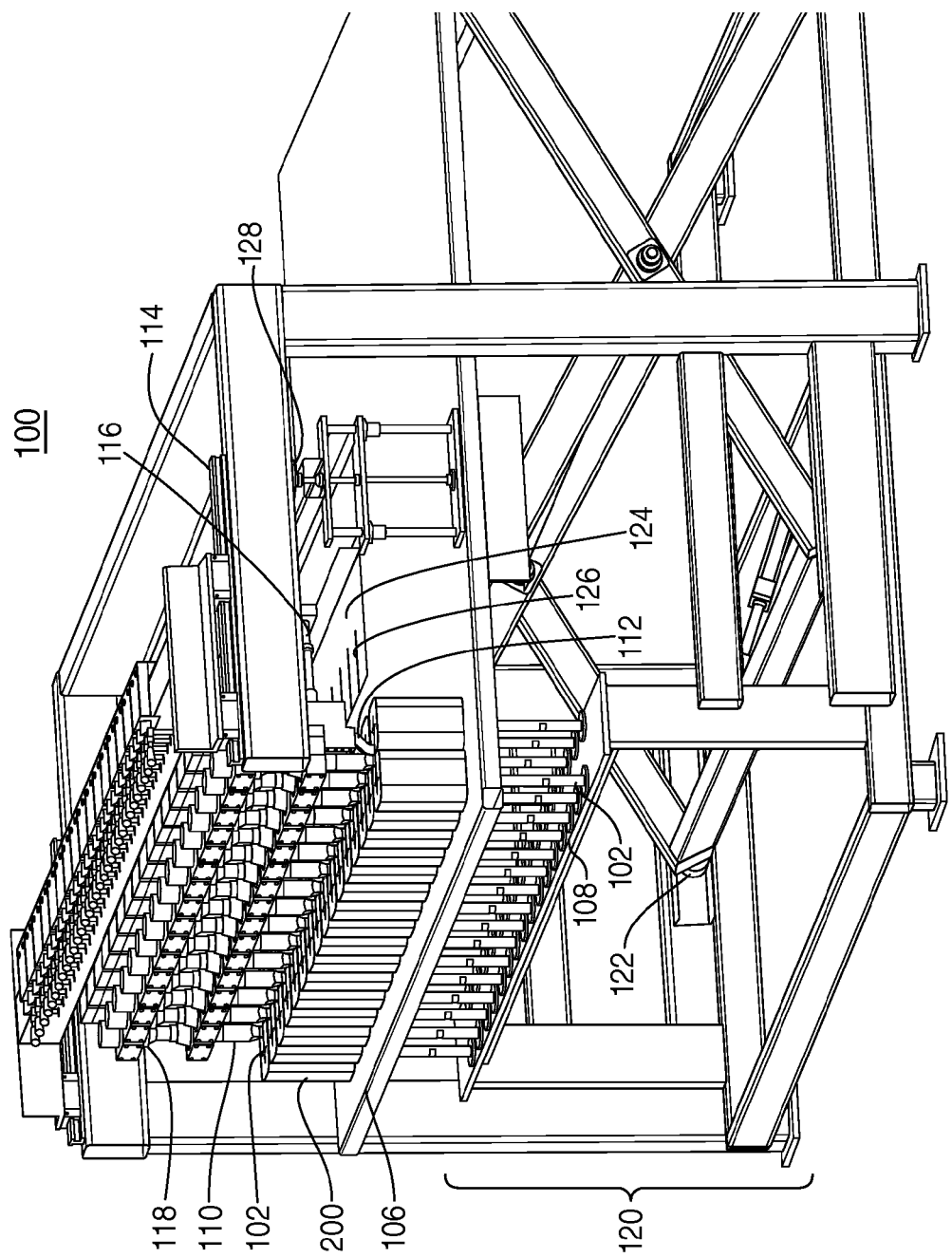
FIG. 7 schematically shows a machine for ultrasonically welding rows of pocketed spring modules to each other.

FIG. 7 schematically shows a machine 100 for ultrasonically welding rows of pocketed spring modules 200 to each other. As shown in FIG. 7, the vibrating probes 110 and anvils 112 are pushed together again to perform another weld as described in FIG. 5. The pocketed spring modules 200 can remain approximately aligned with the pegs 102 during this portion of the procedure.

Welds can be overlapped, e.g., for greater strength. Generally, the vibrating probes and anvils can place welds anywhere along a vertical line on the pocket fabric. Further, the strength of said welds is tunable by controlling welding pulse (1) frequency, (2) energy level and (3) amount of vibrating probe pressure against the corresponding anvil. Different numbers and vertical placements of weld positions can also be used to control use characteristics, such as firmness, of the resulting cushioning unit.

Figure 8:
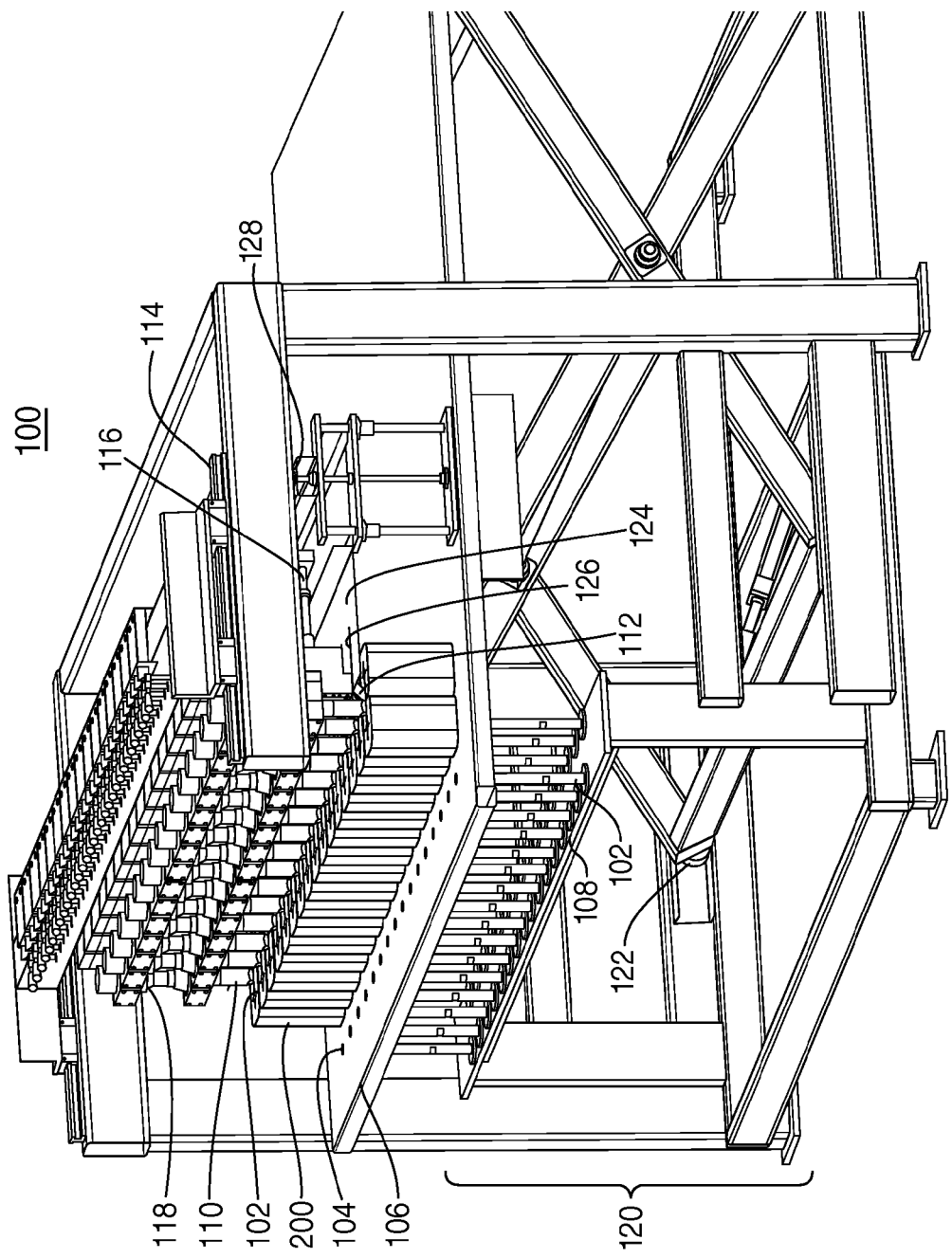
FIG. 8 schematically shows a machine for ultrasonically welding rows of pocketed spring modules to each other.

FIG. 8 schematically shows a machine 100 for ultrasonically welding rows of pocketed spring modules 200 to each other. In FIG. 8, the vibrating probes 110 and anvils 112 have moved, pushing the now welded together modules 200 so that the openings in the frontward row of modules 200 are aligned over the far row of pegs 102. This places a far edge (or more) of the far row of pocketed spring modules 200 (as shown in FIG. 8, the row of modules 200 currently on the row of anvils 112) under the extractor plate 124. The vibrating probes 110 and anvils 112 can perform a weld during or at the beginning (or prior) or end (or after) of this movement.

Figure 9:
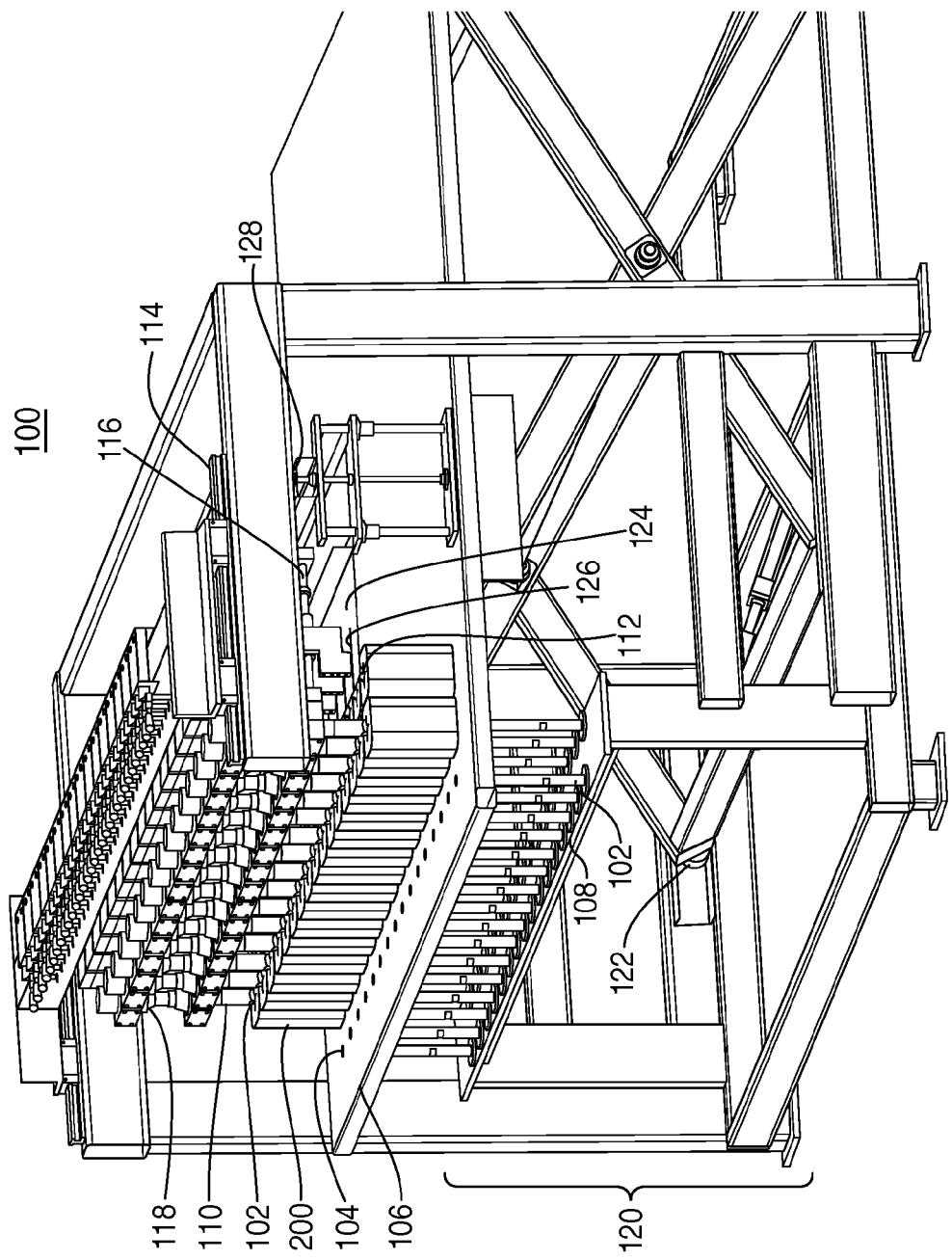
FIG. 9 schematically shows a machine for ultrasonically welding rows of pocketed spring modules to each other.

The extractor plate 124 has holes 126 corresponding to the locations of the vibrating probe 110 and the anvil 112; as shown in FIGS. 8 and 9, the holes 126 partially or fully surround the anvils 112 and/or the vibrating probes 110 when a front row of modules 200 is in position to be transferred to the far row of pegs 102.

FIG. 9 schematically shows a machine 100 for ultrasonically welding rows of pocketed spring modules 200 to each other. In FIG. 9, the vibrating probes 110 and anvils 112 have separated and moved back to their original relative position, with the vibrating probes 110 now located over the far row of pegs 102.

Figure 10:
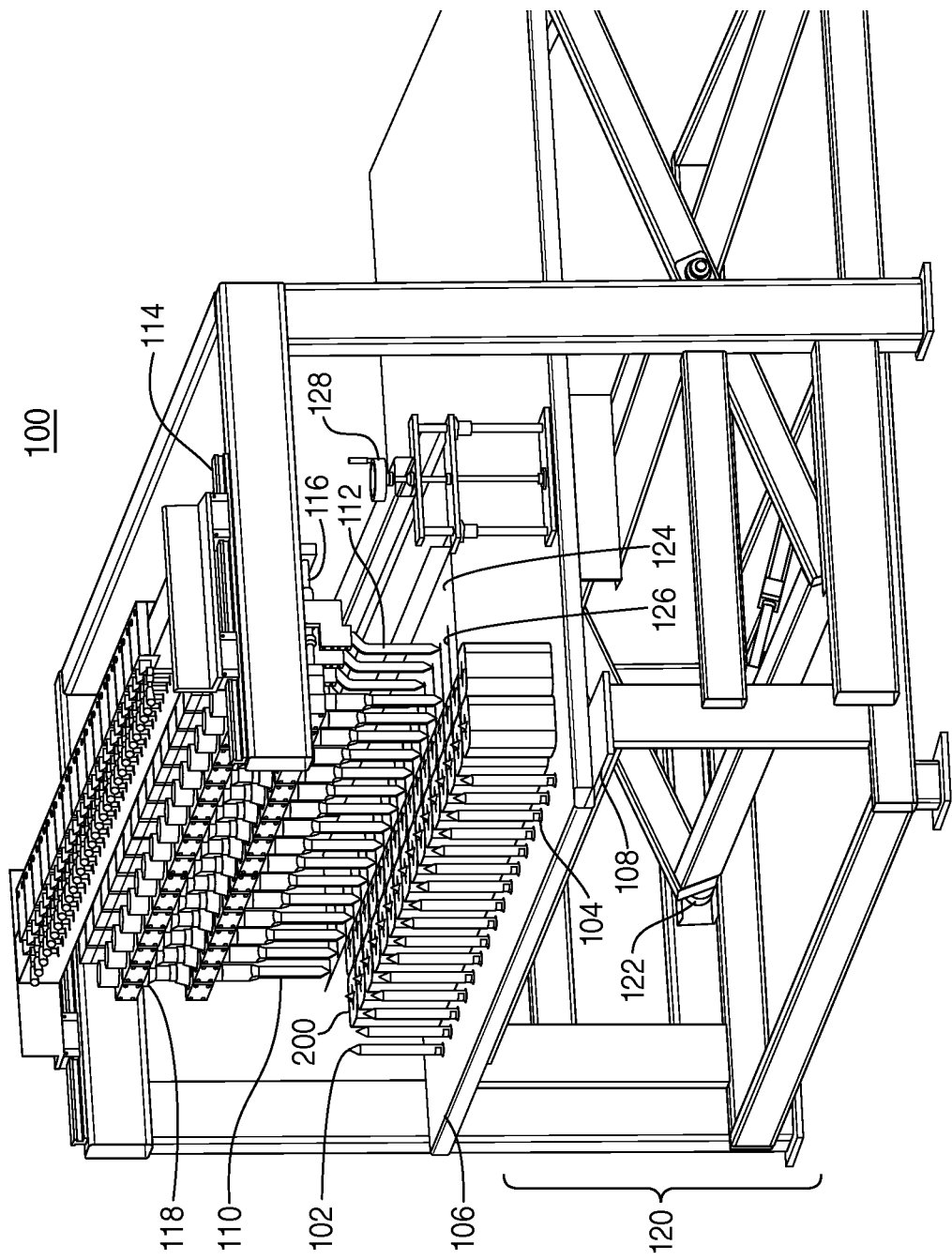
FIG. 10 schematically shows a machine for ultrasonically welding rows of pocketed spring modules to each other.

FIG. 10 schematically shows a machine 100 for ultrasonically welding rows of pocketed spring modules 200 to each other. The liftable table 106 is connected to, and rises and falls with, the extractor plate 124, which is oriented approximately parallel to the liftable table 106. When the table is lowered as shown in FIG. 10, the extractor plate 124 lowers too, pushing the now-joined rows of pocketed spring modules 200 off the vibrating probe 110 and the anvil 112, and pushing the holes 202 of the front row of pocketed spring modules 200 onto the far row of pegs 102 (as explained above, the vibrating probes 110 were located over the pegs 102 in FIG. 9). A crank 128 can be used to adjust the height of the liftable table 106 to correspond to the height of the pocketed spring modules 200.

Figure 11:
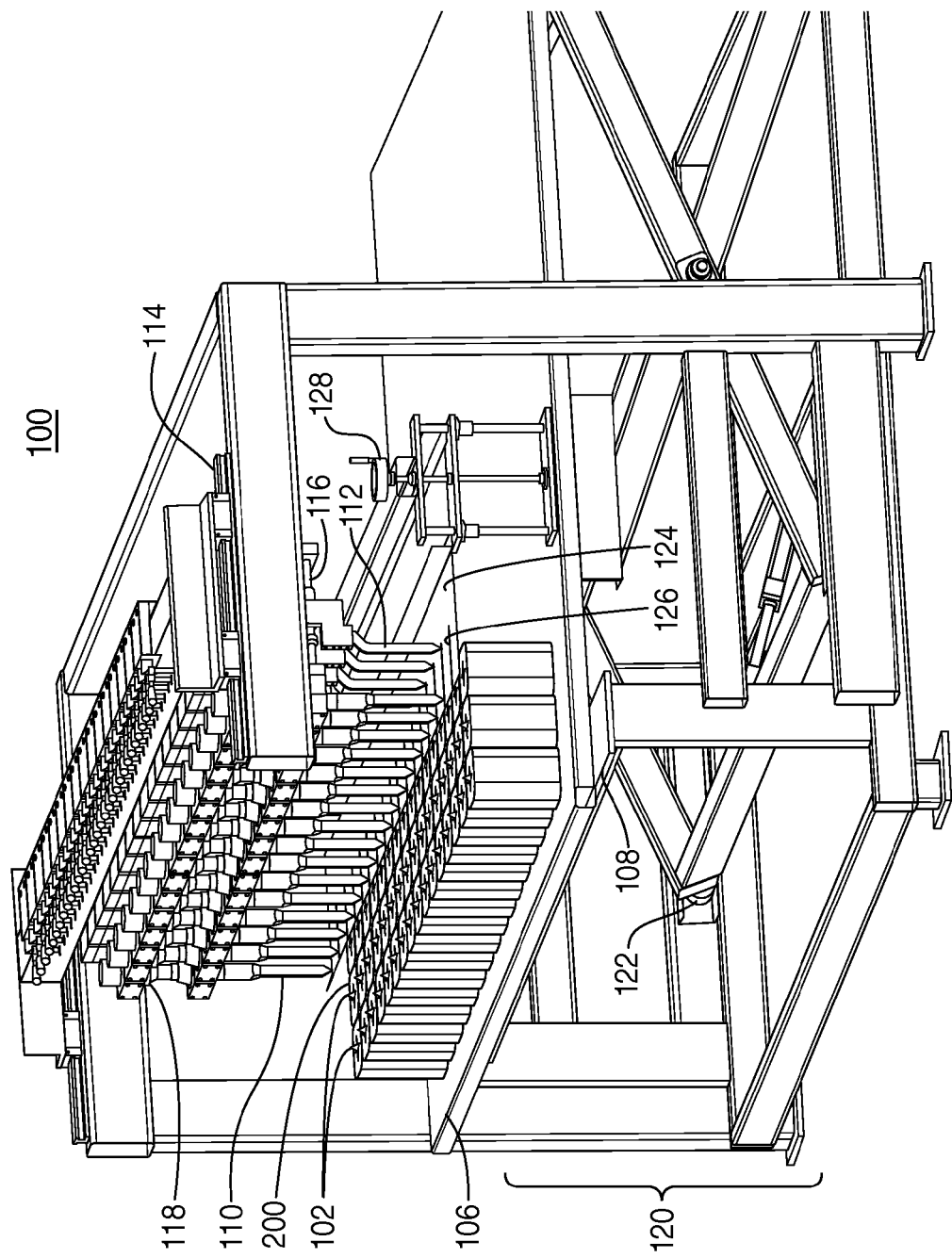
FIG. 11 schematically shows a machine for ultrasonically welding rows of pocketed spring modules to each other.

FIG. 11 schematically shows a machine 100 for ultrasonically welding rows of pocketed spring modules 200 to each other. In FIG. 11, a new row of pocketed spring modules 200 has been placed on the front row of pegs 102 by positioning the holes 202 of the modules 200 over the pegs 102 and dropping or pushing the row of modules 200 onto the pegs 102.

Figure 12:
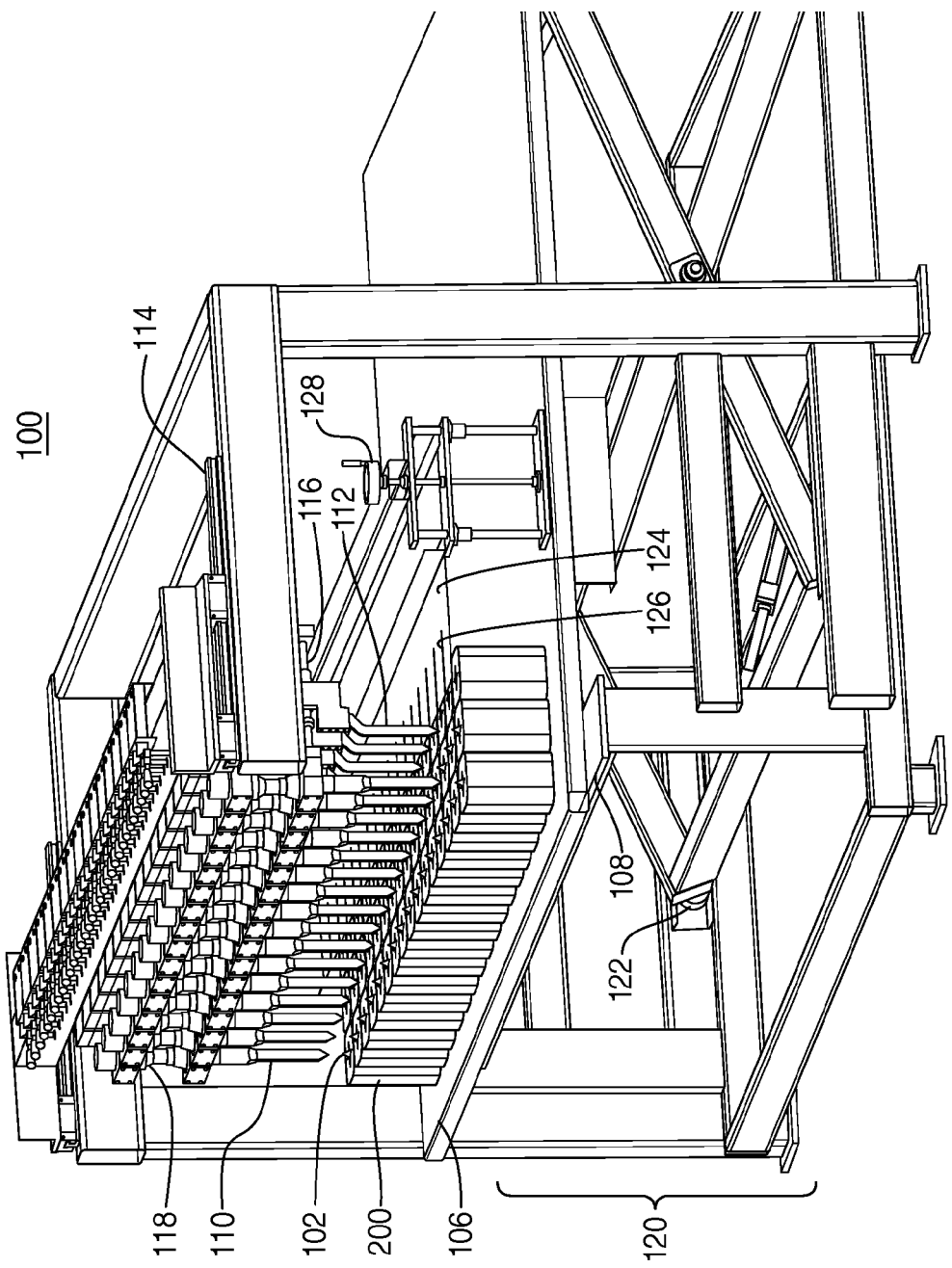
FIG. 12 schematically shows a machine for ultrasonically welding rows of pocketed spring modules to each other.

FIG. 12 schematically shows a machine 100 for ultrasonically welding rows of pocketed spring modules 200 to each other. In FIG. 12, the vibrating probes 110 and anvils 112 have moved to vertically align with the front and rear rows of pegs 102, respectively. This point in the process corresponds to FIG. 3, but with one far-most (right-most) row of pocketed spring modules 200 already welded to the middle row of pocketed spring modules 200 with a number of no-glue connections.

Figure 13:
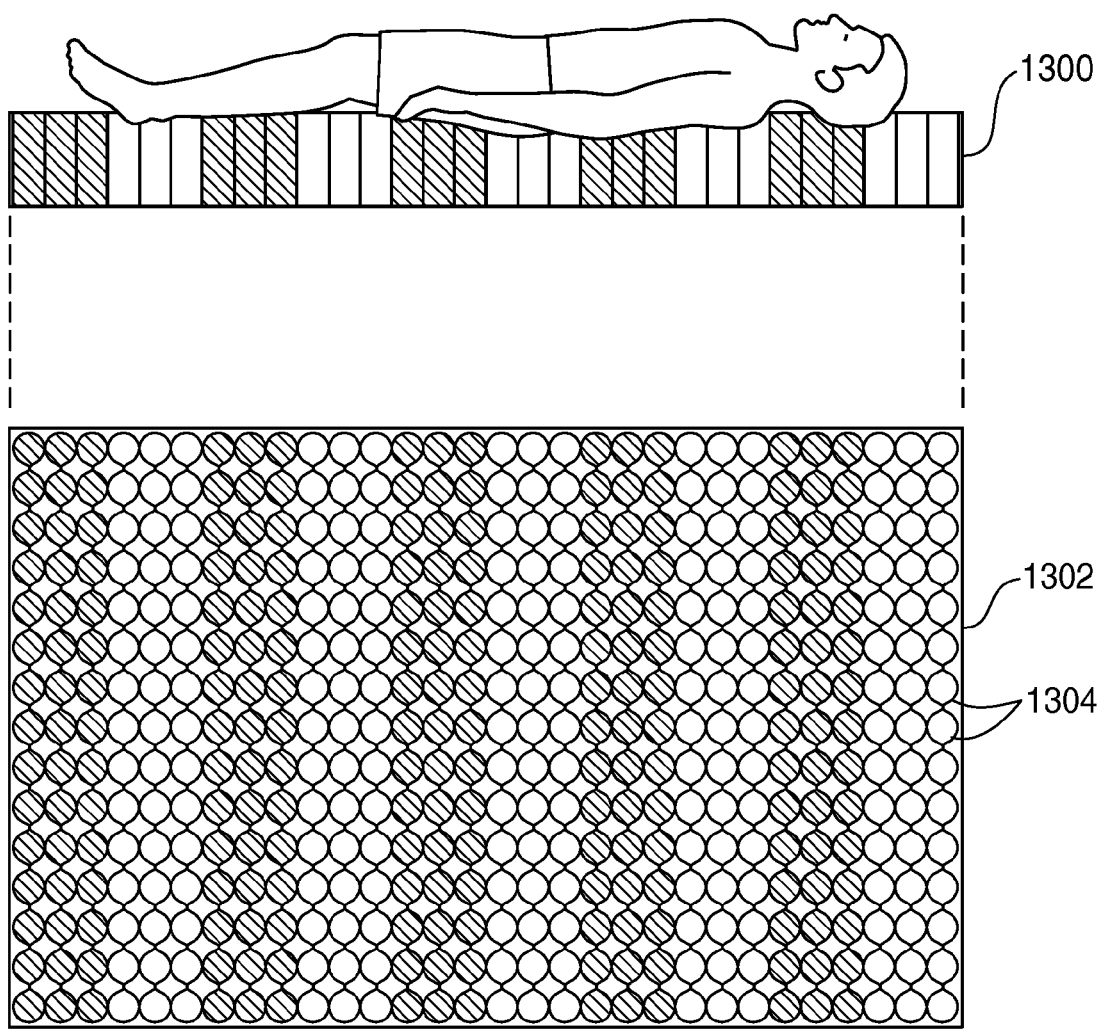
FIG. 13 schematically shows an example of a mattress which has a core of many pocketed spring units which are mechanically joined together without glue, using a process like that shown in FIGS. 1-12.

FIG. 13 schematically shows a mattress 1300. Generally, a mattress 1300 comprises a core 1302, upholstery and a fabric cover (typically called ticking). The core 1302 provides support for a user, upholstery cushions the core 1302, and the fabric cover is wrapped around the core 1302 and upholstery and contributes both aesthetics and texture to the surface of the mattress 1300.

In preferred embodiments, the core 1302 comprises many pocketed spring units 1304. The upholstery can also comprise pocketed spring units, such as pocketed microcoil spring units.

Figure 14:
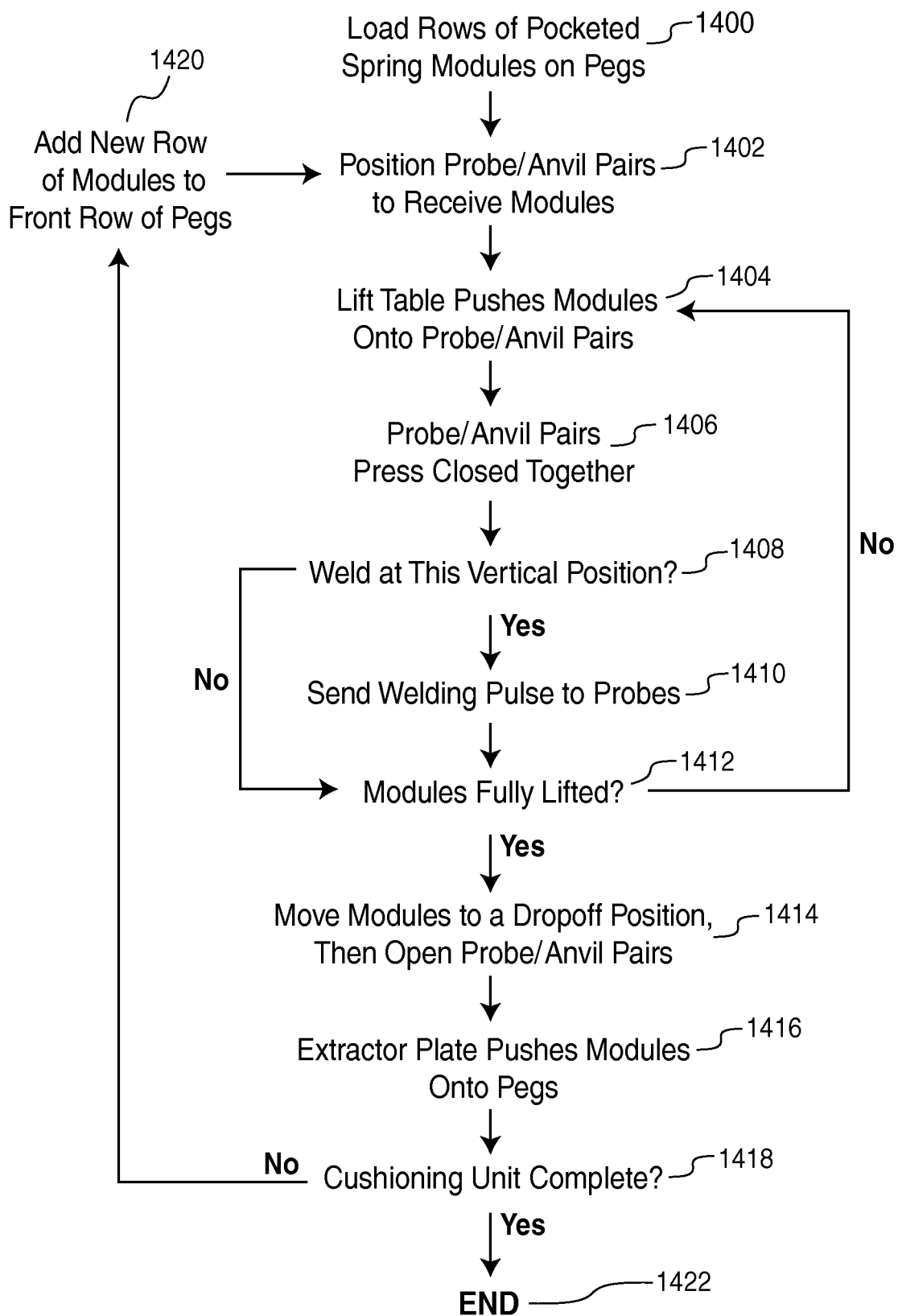
FIG. 14 shows an example of a process for welding rows of pocketed spring modules together.

FIG. 14 shows an example of a process for welding rows of pocketed spring modules 200 to each other. Pocketed spring modules 200 are loaded onto rows of pegs 102 in step 1400. Paired vibrating probes 110 and anvils 112 (preferably arranged in rows) are positioned over the pegs 102 to receive the modules 200 in step 1402. The liftable table 106 then pushes the modules 200 partially or fully onto the vibrating probes 110 and anvils 112 in step 1404, and the vibrating probes 110 and anvils 112 are pressed closed, with pocket material pressed between them, in step 1406. If a weld is planned for this vertical position on the pocket material 1408, a welding pulse is transmitted to the vibrating probes 110 and the modules 200 are welded together at this vertical position. Otherwise 1408, the welding pulse is skipped. If the modules 200 are not fully lifted onto the vibrating probes 110 and anvils 112 at step 1412, the process repeats from step 1404.

If the modules 200 are fully lifted 1412, the vibrating probes 110 and anvils 112 (still closed together) move the modules 200 to a dropoff position, and the vibrating probes 110 and anvils 112 then open (move apart) 1414. Once the dropoff position is reached and the vibrating probes 110 and anvils 112 have opened such that the vibrating probes 110 are vertically aligned with the far row of pegs 102, the extractor plate 124 pushes the modules 200 onto the pegs 102 in step 1416. If the cushioning unit is planned to have more rows of modules 200 welded on (is not complete) 1418, then a new row of modules 200 is added to the front row of pegs 102 at step 1420, and the process repeats from step 1402. If the cushioning unit is complete 1418, then the process ends 1422. The cushioning unit can then be removed from the assembly mechanism (if necessary).

Alternatively, if the cushioning unit is complete at step 1414, step 1414 can move the modules to a dropoff position away from pegs, so that the cushioning unit can easily be removed from the assembly mechanism following (or as a result of) step 1416.

According to some but not necessarily all embodiments, there is provided: A method for glueless assembly of cushioning units, comprising: a) inserting one of at least one probe/anvil pair into openings in a first continuous row of connected multiple-coil modules, and inserting the other of said probe/anvil pair into openings in a second continuous row of connected multiple-coil modules; wherein individual ones of said modules comprise more than two pocketed springs which together surround one of said openings; and wherein individual ones of said pocketed springs each comprise a spring inside a pocket made of a flexible material; b) moving said probe/anvil pair together, and applying acoustic power to said probe, to thereby weld said first and second rows of multiple-coil modules together at one or more locations; c) removing at least one of said first and second rows of modules from said probe/anvil pair; and repeating said steps (a), (b) and (c) until more than two rows of modules have been thereby welded together to form a cushioning structure having an extended area.

According to some but not necessarily all embodiments, there is provided: A method for glueless assembly of cushioning units, comprising: putting openings of first and second rows of pocketed spring modules onto first and second rows of locator pins respectively; wherein individual ones of said pocketed spring modules comprise more than two pocketed springs which together surround one of said openings; and wherein individual ones of said pocketed springs each comprise a coil spring inside a pocket made of a flexible material; transferring said first and second rows of pocketed spring modules from said first and second rows of locator pins onto a double row of probe/anvil pairs; moving the probe and anvil of ones of said probe/anvil pairs together, and welding said first and second rows of pocketed spring modules together by applying acoustic power to said probes; and repeating said moving and welding steps on said first and second rows of pocketed spring modules at multiple different coaxial positions, to thereby form welding at multiple vertical positions on said first and second rows of pocketed spring modules.

According to some but not necessarily all embodiments, there is provided: A method for glueless assembly of cushioning units, comprising: putting first and second rows of pocketed springs onto first and second rows of locator pins respectively; wherein individual ones of said pocketed springs each comprise a coil spring in a pocket made of a flexible material; transferring said first and second rows of pocketed springs from said first and second rows of locator pins onto a double row of probe/anvil pairs; and moving the probe and anvil of ones of said probe/anvil pairs together, and applying acoustic power to said probes to thereby weld said first and second rows of pocketed springs together.

According to some but not necessarily all embodiments, there is provided: A method for glueless assembly of extended area cushioning units, comprising the steps of repeatedly: loading first and second rows of pocketed springs onto first and second rows, respectively, of locator pins; wherein individual ones of said pocketed springs each comprise a coil spring in a pocket made of a flexible material; welding said first and second rows of pocketed springs together, with a relative alignment determined by said first and second rows of locator pins; loading said first row of pocketed springs onto said second row of locator pins, and loading an additional row of pocketed springs onto said first row of locator pins; and repeating said welding step to weld said first row of pocketed springs together with said additional row of pocketed springs.

According to some but not necessarily all embodiments, there is provided: A method for glueless assembly of cushioning units, comprising: putting openings of first and second rows of pocketed spring modules onto first and second rows of locator pins respectively; wherein individual ones of said pocketed spring modules comprise more than two pocketed springs which together surround one of said openings; and wherein individual ones of said pocketed springs each comprise a coil spring inside a pocket made of a flexible material; transferring said first and second rows of pocketed spring modules from said first and second rows of locator pins onto a row of probe/anvil pairs using a lifting table, and using said probe/anvil pairs to ultrasonically weld said first and second rows of modules together; moving said row of probe/anvil pairs, with said first and second rows of modules still in place thereon, into a dropoff position; and pushing said first and second rows of modules off of said row of probe/anvil pairs, using an extractor plate which generally surrounds ones of said probe/anvil pairs.

According to some but not necessarily all embodiments, there is provided: A method for glueless assembly of cushioning units, comprising the steps of repeatedly: welding rows of pocketed spring modules together using vibrating probes and anvils; wherein individual ones of said pocketed spring modules comprise more than two pocketed springs which together surround an opening; and wherein individual ones of said pocketed springs each comprise a coil spring inside a pocket made of a flexible material; and repeating said welding step on successive rows of modules to form a cushioning structure having an extended area, in which adjacent modules are welded together in both length and width directions of the cushioning structure; wherein said welding step is performed differently, in different operations, to provide a variable vertical extent of welding, for a given height of the pocketed springs, to provide a selected degree of firmness in the cushioning structure.

According to some but not necessarily all embodiments, there is provided: A method of assembling an extended area cushioning structure comprising: (a) pocketing a plurality of coil springs inside a flexible material, at least some individual ones of said coil springs being located in separate pockets which are separated from each other and formed into linear connected rows of pocketed coil springs by welds in said flexible material; (b) welding together pairs of said linear connected rows of pocketed coil springs to form linear connected rows of modules; wherein individual ones of said modules comprise more than two pocketed springs which together surround an opening; and (c) repeatedly welding together pairs of said linear connected rows of modules to thereby form a cushioning support structure having an extended area, in which adjacent modules are welded together in both length and width directions of the cushioning support structure; (d) wherein individual ones of said pocketed coil springs are joined together, in the center of said support structure, by polymer welds, and not by glue.

According to some but not necessarily all embodiments, there is provided: A method for glueless assembly of cushioning units, comprising: arranging two or more adjacent rows of multiple side-by-side connected pocketed springs of uniform coil size, ones of said pocketed springs comprising a spring in a pocket made of a flexible material, corresponding springs in adjacent ones of said rows being arranged side-by-side; and closing together and activating multiple welding pairs of vibrating probes and anvils at multiple locations substantially simultaneously, ones of said activated welding pairs ultrasonically welding pocket material between two adjacent pairs of pocketed springs from two different ones of said rows.

According to some but not necessarily all embodiments, there is provided: A method of making a mattress, comprising: assembling a core by welding rows of pocketed spring modules together without glue; wherein individual ones of said pocketed spring modules comprise more than two pocketed springs which together surround an opening; and wherein individual ones of said pocketed springs each comprise a coil spring inside a pocket made of a flexible material; and repeating said welding step on successive rows of modules to form a cushioning support structure having an extended area, in which adjacent modules are welded together in both length and width directions of the cushioning support structure; and padding said core with upholstery, and wrapping said padded core with a fabric cover.

According to some but not necessarily all embodiments, there is provided: A method of making a mattress, comprising: assembling an upholstery by connecting without glue multiple rows of multiple pocketed microcoil springs, ones of said pocketed microcoil springs comprising a microcoil spring in a pocket made of a flexible material, said rows of pocketed microcoil springs being connected by welds formed using ultrasonic vibrational energy, said welds being located with variable vertical weld extent on said flexible folding material between said pockets; and padding a core with said upholstery, and wrapping said padded core with a fabric cover.

According to some but not necessarily all embodiments, there is provided: A mechanism for glueless assembly of pocketed units, comprising: (a) at least first and second adjacent and mutually parallel rows of locator pins configured to position two or more adjacent rows of pocketed spring modules; wherein individual ones of said pocketed spring modules comprise more than two pocketed springs which together surround an opening; and wherein individual ones of said pocketed springs each comprise a coil spring inside a pocket made of a flexible material; and (b) one or more welding pairs of vibrating probes and contact prongs configured to receive said rows of pocketed spring modules from said locator pins and to close together to compress and ultrasonically weld pocket material between two adjacent pairs of pocketed springs from two different rows of pocketed spring modules.

According to some but not necessarily all embodiments, there is provided: A mechanism for glueless assembly of pocketed spring units, comprising: at least one vibrating probe and at least one anvil having a noncontact portion and a contact portion, said contact portion parallel to and configured to press flush against said vibrating probe during ultrasonic welding, said noncontact portion configured to be distal from said vibrating probe when said contact portion and said vibrating probe are pressed flush, said vibrating probe and said anvil configured to be relatively moveable, wherein two rows of pocketed spring modules are welded together when layers of pocket fabric corresponding to both of said rows of pocketed spring modules are pressed between said vibrating probe and said contact portion and a welding pulse is transmitted to said vibrating probe.

According to some but not necessarily all embodiments, there is provided: A mechanism for glueless assembly of pocketed inner spring units, comprising: at least two rows of locator pins which protrude through a lifting table; a double row of probe/anvil pairs, said probe/anvil pairs configured to press flush together in a welding position, and to create welds between multiple layers of flexible spring pocket material compressed between said probe/anvil pairs when a welding pulse is passed through said vibrating probes when in said welding position; said lifting table configured to transfer multiple rows of pocketed spring modules from said locator pins to said probe/anvil pairs; wherein individual ones of said pocketed spring modules comprise more than two pocketed springs which together surround an opening; and wherein individual ones of said pocketed springs each comprise a coil spring inside a pocket made of said material; and an extractor plate configured to transfer said rows of pocketed spring modules off of said probe/anvil pairs.

According to some but not necessarily all embodiments, there is provided: A mechanism for glueless assembly of cushioning units, comprising: at least one probe/anvil pair, one of said probe/anvil pair configured to be inserted into openings in a first row of modules, and the other of said probe/anvil pair configured to be inserted into openings in a second row of modules; wherein individual ones of said modules comprise more than two pocketed springs which together surround one of said openings; and wherein individual ones of said pocketed springs each comprise a spring inside a pocket made of a flexible material; a transporter, configured to move said probe/anvil pairs together and apart, and between module pickup and module dropoff positions; a lifter, configured to pickup said first and second rows of modules onto said probe/anvil pairs; an extractor, configured to dropoff said first and second rows of modules from said probe/anvil pair at a module dropoff position after said first and second rows of modules are welded together; and an acoustic power source, configured to apply acoustic power to said probes when said probe/anvil pairs are moved together, to thereby weld said first and second rows of modules together at one or more locations.

According to some but not necessarily all embodiments, there is provided: A cushioning structure comprising: a plurality of coil springs pocketed inside a flexible folding material, at least some individual ones of said coil springs being located in separate pockets which are separated from each other by welds in said flexible material and are formed into linear connected rows of pocketed coil spring modules; wherein individual ones of said modules comprise more than two pocketed coil springs which together surround an opening; and a plurality of said rows being connected into a single extended unit to provide a support structure which is wider than any of said rows; wherein individual ones of said rows are welded together, in the center of said support structure, completely without glue.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

As used herein and as is apparent from the disclosure set forth hereinabove, "left" and "right" (and "front" and "far") are arbitrary terms signifying generally opposing directions, respectively oriented towards pre-weld (generally, welding machine entrance) and post-weld (generally, welding machine exit) pocketed spring module positions as shown in FIGS. 1-12.

In some embodiments, the vibrating probes and anvils start in different positions than shown in FIG. 1.

In some embodiments, probe/anvil pairs move the rows of modules over to a dropoff position once the modules are fully off of the pegs; in some embodiments, once the modules are fully loaded onto the probe/anvil pairs; in some embodiments, at some (or any) time between.

In some embodiments, a pocketed springs in a row of pocketed springs may be connected to each other by material other than the material used to form pockets.

In some embodiments, pocketed springs may be formed by welding pocketed springs to a strip or strips of flexible material (e.g., the material used to form pockets).

In some embodiments, different lengths or portions of the vibrating probe may be tuned to comprise the active welding portion.

In some embodiments, rows of pocketed spring modules can be automatically fed onto rows of pegs.

In some embodiments, rows of pocketed spring modules can be manually fed onto rows of pegs.

In some embodiments, the vibrating probes and anvils are moved leftward and rightward together (or separately) by the same transportation system that pushes them together and apart for welding.

In some embodiments, lifting mechanisms other than servo motors are used to lift the liftable table, such as hydraulic motors.

In some embodiments, other transportation types (than rails) and motor types are used to move the vibrating probes left-wards and right-wards, and together and apart, than described hereinabove.

In some embodiments, the vibrating probe moves to the anvil to press flush against the anvil prior to welding.

In some embodiments, the anvil moves to the vibrating probe to press flush against the vibrating probe prior to welding.

In some embodiments, the vibrating probe and anvil both move to press flush against each other prior to welding.

In some embodiments, vibrating probes have more than one active region. In some embodiments with vibrating probes with more than one active region, a single welding pulse can be used to perform more than one weld simultaneously (i.e., a weld caused by more than one active region on a vibrating probe). In some embodiments with vibrating probes with more than one active region, vibrating probes have an active region proximal to their top and an active region proximal to their bottom. In some embodiments with vibrating probes with more than one active region, multiple welds, in multiple vertical positions, caused by a single welding pulse, can securely hold two modules together.

In some embodiments, the probes and/or anvils push the modules into a dropoff position while the probes and anvils are separated from each other (open).

In some embodiments, something other than the probes and/or anvils (e.g., a pusher rod or plate) moves the modules into a dropoff position Particular left/right orientations of the vibrating probe and anvil have been described and shown with respect to the disclosed inventions. It will be apparent to one of ordinary skill in the arts of machine engineering of manufacturing machinery that alternative orientations of probe/anvil pairs are possible; e.g., reversed orientation, or at +/−30 degrees from the front-ward/far-ward axis of the welding machine (the latter orientation(s), for example, to weld rows of hexagonal 6-pocketed spring modules together), or orthogonally to a feed axis of the welding machine (e.g., to weld disjoint subrows of modules together).

It will also be apparent to said person of ordinary skill that double rows of probe/anvil pairs need not be fully segregated (i.e., that a row can consist of both probes and anvils).

In some embodiments, probe/anvil pairs can be arranged otherwise than in orderly rows.

In some embodiments, one or more probe/anvil pairs can be configured to open and close at different times from other probe/anvil pairs.

In some embodiments vibrations of vertically-oriented probes will be horizontal along approximately the same axis as formed by the line of vibrating probes (e.g., approximately orthogonal to both the front-ward/far-ward axis and the vertical axis of a machine as pictured in FIGS. 1-12).

In some embodiments, different probe/anvil pairs can be caused to weld at different vertical positions.

In some embodiments, for some welding events, some of the probes are not transmitted a welding pulse.

In some embodiments, probe/anvil pairs can close at different times from each other.

In some embodiments, different probes can be transmitted different welding pulses (e.g., to create different strength welds).

Particular up/down orientations have been described hereinabove with respect to, e.g., the lifting table and extractor plate. It will be apparent to one of ordinary skill in the arts of machine engineering of manufacturing machinery that alternative orientations (rather than along a z axis) are possible.

In some embodiments, the springs are in the pockets prior to welding.

In some embodiments, three or more rows of pocketed springs are welded together substantially simultaneously.

In some embodiments welding three rows together substantially simultaneously, two pairs of vibrating probe and anvil perform welds at a given horizontal position; in other such embodiments, an anvil moves sequentially to two different vibrating probes at a given horizontal position; in other such embodiments, a vibrating probe moves sequentially to two different anvils at a given horizontal position.

In some embodiments, a weld is performed while the vibrating probes and anvil are moving relative to the rows of pegs.

In some embodiments in which the upholstery comprises rows of pocketed microcoil springs, the core can be of a type other than pocketed springs, e.g., continuous coils.

In some embodiments, rows of modules comprise disjoint subrows of modules, such that two disjoint subrows of modules are not connected to each other.

In some embodiments using disjoint subrows of modules, disjoint subrows comprising a first row are connected to each other when they are welded to a full row of modules, or welded to a subrow of modules that is disjoint from other subrow(s) of modules comprising a corresponding second row at a location that is not aligned with the disjunction(s) in the first row.

In some embodiments using disjoint subrows of modules, disjoint subrows are connected to form a non-disjoint row of modules by welding pocket fabric of disjoint subrows at the location of the disjunction.

In some embodiments, a row of pocketed springs (not modules) is configured to be positioned by pegs and welded to another row of pocketed springs (not modules); for example, using openings described by cylinders (open at top and bottom) or rings formed from excess pocketed spring fabric, or welded onto the rows of pocketed springs. In some such embodiments, each said row of pocketed springs is itself a doubled row of pocketed springs.

In some embodiments, the liftable table comprises only sufficient structure to transfer the rows of modules from the locator pins to the probe/anvil pairs, or is a continuous structure except where penetrated by locator pins, and can generally be anything between (e.g., a set of parallel strips, or strips in a criss-cross pattern, or any other shape or pattern capable of pushing rows of modules from the locator pins onto the probe/anvil pairs). In some embodiments, rows of modules are supported by a stationary or separately movable resting table in addition to or instead of the liftable table when the liftable table is at a position where rows of modules are fully loaded onto the locator pins (or at a lowest position).

Preferably one "module" of pocketed springs includes exactly four pocketed springs which totally surround a vertical opening which extends for the full height of a pocketed spring. However, in alternative and less preferred embodiments, more or fewer pocketed springs can be used to define a single module.

In some embodiments, pocketed spring modules comprise pocketed springs having uniform coil-to-coil distance in a length direction of the cushioning unit, and different uniform coil-to-coil distance in a width direction of the cushioning unit.

While ultrasonic welding is the currently preferred and most proven embodiment, other techniques can be used to weld the pocketed springs together. For one example, it is contemplated that induction heating can be used to provide localized spot heating—and hence, under pressure, welding—of the two layers of flexible material which are being held together by the probe and anvil. For another example, the probe and anvil can be used as conductors for simple ohmic heating. The location where the probe and anvil have pinched two layers of flexible material between them can be analyzed as a metal-insulator-metal (MIM) capacitor, and superficial modification can be performed to generate localized ohmic heating at the contact areas of the probe and/or anvil.

The pockets which will contain the springs can be formed, for example, from a continuous strip of folded polymer material. Welds are formed across this strip to separate the pockets from each other. As noted above, the pockets preferably have openings on their sides where a flattened coil spring can be inserted and released; once the coil spring is allowed to expand into the pocket, its ends will stay at the ends of the pocket.

Two such strips can then be welded together at every other weld location. This produces a strip of modules, where each module includes four pocketed spring units surrounding an opening. Such a strip of modules is shown in FIG. 2 and the following figures.

Optionally the strip of modules can be trimmed to the desired width (or length) of the finished structure before the steps of FIGS. 1-12 are performed. However, alternatives are possible, as will be readily recognized by those of ordinary skill in the arts of machine engineering of manufacturing machinery.

In some embodiments, alternative shapes can be used for the extractor plate, such as multiple extractor fingers, or an extractor rod parallel to the table and to the axis formed by a row of modules (i.e., from one end of the row to the other end of the row).

In some embodiments, a far edge (or more) of a front row of modules located on the vibrating probes is under the extractor plate when the front row of modules is in position to be transferred to the far row of pegs.

In some embodiments, the extractor plate is shaped to push on different portions of the front and far rows of modules than described above.

In some embodiments, a manual or automated mechanism other than a crank can be used to control the height of the table. In some embodiments, a crank or other mechanism can be used to control the height of the extractor plate.

In some embodiments, multiple welds for rows of modules are performed substantially simultaneously; in some embodiments, welds for said rows are (or can be) performed sequentially.

In some embodiments, pockets have insertion slots in the side.

In some embodiments, pocket material is a sheet of flexible polymer.

In some embodiments, coil springs have non-uniform (but known) diameter.

In some embodiments, coil springs have non-uniform (but known) spacing from each other.

In some embodiments, all rows of modules are transferred from the pegs to the vibrating probes and anvils substantially simultaneously.

In some embodiments, pegs are steel, and have approximately frustroconical tips.

In some embodiments, the liftable table and extractor plate can move separately.

In some embodiments, the extractor plate is mechanically connected to the liftable table at an adjustable distance therefrom.

Additional general background, which helps to show variations and implementations, may be found in the following publications, all of which are hereby incorporated by reference: U.S. Pat. Nos. 5,772,100; 3,844,869; 4,234,983; 4,401,501; 6,131,892; 6,260,331; 6,347,423; 6,101,697; 6,021,627; 5,613,287; 5,553,443; 4,439,977; 4,485,506; 5,749,133; 5,613,287; 4,986,518; 4,906,309; 4,854,023; 4,523,344; 4,234,984; 3,251,078; 2,540,441; 1,226,219; 1,192,510; and 685,160; and published U.S. patent applications 20120311784, 20120091644, 20110191962, 20110107572, 20100218318, 20100212090, and 20080245690.

Additional general background, which helps to show variations and implementations, as well as some features which can be implemented synergistically with the inventions claimed below, may be found in the following US patent applications. All of these applications have at least some common ownership, copendency, and inventorship with the present application, and all of them, as well as any material directly or indirectly incorporated within them, are hereby incorporated by reference: U.S. Pat. Nos. 6,131,892; 6,260,331; and 6,347,423.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for glueless assembly of cushioning units, comprising:
   a) inserting one of at least one probe/anvil pair into openings in a first continuous row of connected multiple-coil modules, and inserting the other of said probe/anvil pair into openings in a second continuous row of connected multiple-coil modules; wherein individual ones of said modules comprise more than two pocketed springs which together surround one of said openings; and wherein individual ones of said pocketed springs each comprise a spring inside a pocket made of a flexible material;

b) moving said probe/anvil pair together, and applying thermal power to said probe, to thereby weld said first and second rows of multiple-coil modules together at one or more locations;

c) removing at least one of said first and second rows of modules from said probe/anvil pair; and repeating said steps (a), (b) and (c) until more than two rows of modules have been thereby welded together to form a cushioning structure having an extended area.

2. The method of claim 1, wherein said probe comprises an active region facing and configured to press against said anvil, said active region configured so that said acoustic power causes said probe to vibrate, and to thereby weld, at said active region.

3. The method of claim 1, wherein said at least one probe/anvil pair comprises a row of probes approximately parallel to a row of anvils.

4. The method of claim 1, wherein said rows of modules are formed by welding two rows of pocketed springs together, and wherein the pockets of ones of said rows of pocketed springs are formed from a single sheet of said flexible material.

5. The method of claim 1, wherein said modules comprise two rows of pocketed springs welded together between non-consecutive pairs of said pocketed springs.

6. The method of claim 1, wherein said modules comprise pocketed springs having uniform coil size and coil-to-coil distance.

7. The method of claim 1, wherein said thermal power is acoustic power.

8. A method for glueless assembly of cushioning units, comprising:

putting openings of first and second rows of pocketed spring modules onto first and second rows of locator pins respectively; wherein individual ones of said pocketed spring modules comprise more than two pocketed springs which together surround one of said openings; and wherein individual ones of said pocketed springs each comprise a coil spring inside a pocket made of a flexible material;

transferring said first and second rows of pocketed spring modules from said first and second rows of locator pins onto a row of probe/anvil pairs using a lifting table, and using said probe/anvil pairs to thermally weld said first and second rows of modules together;

moving said row of probe/anvil pairs, with said first and second rows of modules still in place thereon, into a dropoff position; and pushing said first and second rows of modules off of said row of probe/anvil pairs, using an extractor plate which generally surrounds ones of said probe/anvil pairs.

9. The method of claim 8, wherein said probe comprises an active region facing and configured to press against said anvil, said probe configured to weld at said active region.

10. The method of claim 8, wherein said at least one probe/anvil pair comprises a row of probes approximately parallel to a row of anvils.

11. The method of claim 8, wherein said rows of modules are formed by welding two rows of pocketed springs together, and wherein the pockets of ones of said rows of pocketed springs are formed from a single sheet of said flexible material.

12. The method of claim 8, wherein said modules comprise two rows of pocketed springs welded together between non-consecutive pairs of said pocketed springs.

13. The method of claim 8, wherein adjacent modules are welded together in both length and width directions of the cushioning unit.

14. The method of claim 13, wherein said welds in both length and width directions of the cushioning unit comprise welds between rows of pocketed springs to form said rows of modules, and said welds between rows of modules formed by said welding step.

15. The method of claim 8, wherein said thermal welding is ultrasonic welding.

* * * * *